United States Patent [19]

Schiessler et al.

[11] 4,153,602

[45] May 8, 1979

[54] PROCESS FOR THE PREPARATION OF A N,N'-DIMETHYL-PERYLENE-3,4,9,10-TETRACARBOXYLIC ACID DIIMIDE PIGMENT

[75] Inventors: Siegfried Schiessler, Frankfurt am Main; Ernst Spietschka, Oberauroff; Reinhard Zunker, Kelkheim, all of Fed. Rep. of Germany

[73] Assignee: Hoechst Aktiengesellschaft, Frankfurt am Main, Fed. Rep. of Germany

[21] Appl. No.: 654,295

[22] Filed: Feb. 2, 1976

[30] Foreign Application Priority Data

Feb. 4, 1975 [DE] Fed. Rep. of Germany ....... 2504481

[51] Int. Cl.$^2$ .................. C07D 471/06; C09B 5/62
[52] U.S. Cl. .................. 546/37; 106/308 Q; 106/288 Q
[58] Field of Search ..................... 260/281 P

[56] References Cited

U.S. PATENT DOCUMENTS

| | | | |
|---|---|---|---|
| 2,473,015 | 6/1949 | Cullinan | 260/282 |
| 2,543,747 | 3/1951 | Shrader | 260/281 P |
| 2,905,685 | 9/1959 | Eckert | 260/281 P |
| 3,340,264 | 9/1957 | Walker | 260/281 P |
| 3,628,976 | 12/1971 | Stocker | 260/281 P |
| 4,018,791 | 4/1977 | Spietschka et al. | 260/281 P |

FOREIGN PATENT DOCUMENTS

| | | | |
|---|---|---|---|
| 1272270 | 7/1968 | Fed. Rep. of Germany | 260/281 P |
| 1963728 | 9/1970 | Fed. Rep. of Germany | 260/281 P |
| 1914208 | 11/1970 | Fed. Rep. of Germany | 260/281 P |
| 2153087 | 10/1975 | Fed. Rep. of Germany | 260/281 P |

*Primary Examiner*—Mark L. Berch
*Attorney, Agent, or Firm*—Curtis, Morris & Safford

[57] ABSTRACT

N,N'-dimethyl-perylene-3,4,9,10-tetracarboxylic acid diimide is obtained as a valuable pigment of a pure red shade, by reacting perylene-3,4,9,10-tetracarboxylic acid anhydride at low temperatures with a dilute aqueous solution of at least the four-fold molar amount of methylamine. The so-obtained bis-ammonium salt of the bis-N-methyl amide is then heated without isolation to effect ring closure while splitting off two mols of water and two mols of methyl amine. The product can be used without any finish operation or can be after-treated to yield a pigment of an exceptionally high transparency or of a good hiding power.

11 Claims, No Drawings

PROCESS FOR THE PREPARATION OF A N,N'-DIMETHYL-PERYLENE-3,4,9,10-TETRACARBOXYLIC ACID DIIMIDE PIGMENT

The present invention relates to a process for the preparation of N,N'-dimethyl-perylene-3,4,9,10-tetracarboxylic acid diimide (hereinafter also called "N,N'-dimethyl-peryl-imide") in the form of a valuable red pigment having a high transparency, and to its use for pigmenting colorless substrates.

It is known that N,N'-dimethyl-perylimide can be prepared be reacting perylene-3,4,9,10-tetracarboxylic acid dianhydride with 2 mols of methyl amine in an aqueous medium. As reuslts, however, from German Offenlegungsschrift No. 1,963,728, this reaction yields crude products which do not yet possess pigment properties. For this reason, the crude dyestuff has to be converted into a pigment by grinding it with salts, as taught for example in German Offenlegungsschrift No. 1,914,208, No. 1,963,728 or No. 2,153,087. Moreover, German Auslegeschrift No. 1,272,270 teaches that the crude N,N'-dimethyl-perylimide can also be converted into a pigment by dissolving the dyestuff in sulfuric acid and introducing the solution into a large excess of water. Both finishing methods require a great economic expenditure, especially due to the necessary purification of waste water.

It has now been found that N,N'-dimethylperylimide can be obtained in a single step as a brilliant pigment having a high tinctorial strength and transparency by reacting perylene-3,4,9,10-tetracarboxylic acid dianhydride with at least 4 mols of methyl amine per mol of dianhydride in a dilute aqueous medium at a low temperature to yield the bis-(methylammonium) salt of perylene-3,4,9,10-tetracarboxylic acid bis-(methylamide), and then heating this salt to form the N,N'-dimethylperylimide.

It has further been found that pigments having an especially high tinctorial strength and transparency are obtained by carrying out this reaction in the presence of surface-active compounds, preferably of resin acids.

The reaction of perylene-3,4,9,10-tetracarboxylic acid dianhydride with at least 4 mols of methyl amine splits the anhydride rings to yield the bis-(methylammonium) salt of perylene-3,4,9,10-tetracarboxylic acid bis(methylamide). This compound is readily soluble in water and sufficiently stable at low temperatures. While 2 mols of methyl amine and 2 mols of water are split off therefrom, this compound is cyclized - at a slow rate at low temperatures and more speedily upon heating - to yield the N,N'-dimethylperylimide which is obtained in the form of a brilliant pigment of high tinctorial strength.

The reaction is advantageously carried out by introducing the perylene-3,4,9,10-tetracarboxylic acid dianhydride into an aqueous solution of methyl amine, since the methyl amine is then always available in excess.

The dianhydride may be used both in a solid form and in the form of an aqueous filter cake as obtained by the synthesis.

The amount of methyl amine advantageously ranges from 4 to 8 mol of perylene-3,4,9,10-tetra-carboxylic acid dianhydride, although an amount exceeding this quantity is possible but not economical. When the amount of methyl amine used is reduced to less than 4 mols per mol of perylene-3,4,9,10-tetracarboxylic acid dianhydride, the pigment quality of the N,N'-dimethylperylimide obtained is impaired considerably.

The amount of water, in which the reaction is carried out, may be varied greatly. Optimum pigment quality is obtained when using 10 to 25 times the weight of water, calculated on the perylene-3,4,9,10-tetracarboxylic acid dianhydride.

The reaction of the perylene-3,4,9,10-tetracarboxylic acid dianhydride with methyl amine to yield the bis-(methylammonium) salt of the perylene-3,4,9,10-tetracarboxylic acid bis-(methylamide) is favorably carried out at temperatures of from 0 to 30° C., preferably from 0 to 10° C., a temperature of essentially less than 0° C., though posible, is not suitable for economical reasons.

It is most advantageous to add the perylene-3,4,9,10-tetracarboxylic acid dianhydride at 0°-5° C., whreupon a solution of the above bis-(methylammonium salt is formed. This solution is relatively stable at this temperature. Cyclization yielding the N,N'-dimethylperylimide is extremely slow at 0°-5° C. A reaction of perylene-3,4,9,10-tetracarboxylic acid dianhydride at higher temperatures prevents the formation of the above bis-(methyl-ammonium) salt since it causes simultaneous cyclization yielding the N,N'-dimethylperylimide. Therefore, with the reaction temperature increasing, the products obtained have a higher degree of opacity and a poorer tinctorial strength.

To shorten the reaction time and ensure a quantitative reaction, the conversion of the bis-(methylammonium) salt into the N,N'-dimethylperylimide is completed at higher temperatures, for example by an after-treatment at 70°-150° C., advantageously performed in a closed vessel to avoid losses in methyl amine.

The pigments obtained have an especially high tinctorial strength and brilliancy if the pigment formation is carried out in the presence of surface-active compounds. As such surfactants, which allow pigment formation in the alkaline medium, anionic and nonionic compounds or mixtures thereof are preferably used. The amount of surfactants used may be varied greatly, but amounts of from 0.5 to 5%, calculated on the weight of perylene-3,4,9,10-tetracarboxylic acid dianhydride, are preferably added. As anionic compounds to be used according to the invention, there are mentioned, for example, salts of fatty acids having more than 10 carbon atoms, salts of naphthenic acids, sulfated aliphatic alcohols having from 8 to 20 carbon atoms, sulfated unsaturated higher fatty acids or the esters thereof, sulfated addition products of 1 to 30 mols of ethylene oxide on compounds containing preferably longchained aliphatic radicals and reactive hydrogen atoms, such as fatty acids, fatty acid amides, amines, aliphatic alcohols or alkylphenols, sulfates of N-acylated alkanolamines, alkylsulfonates, alkylaryl-sulfonates or sulfonates of polycarboxylic acid esters.

As nonionic compounds to be used according to the invention, there may be mentioned addition products of 1 to 30 mols of ethylene oxide on higher fatty acid, fatty acid amides, aliphatic alcohols, aliphatic amines or alkylphenols, monoglycerides of fatty acids or N-acylated alkanol-amines.

Especially valuable pigments having a high transparency are obtained if their formation is carried out in the presence of resin acids or salts thereof.

As resins acids, there are mentioned any natural or synthetic resin types containing one or more acid groups in the molecule, for example colophony (rosin)

or resins having a substantial percentage of colophony; hydrogenated or dimerized colophony resins, hydrolyzable maleinate resins, hydrolyzable alkyd resins which are free of oil, and phenol resins which are modified by colophony. The resin acids are preferably added in amounts of from 2 to 20% by weight, especially from 5 to 10% by weight, calculated on the perylene-3,4,9,10-tetracarboxylic acid dianhydride.

The resin acids or the salts thereof are preferably added to the reaction mixture after the formation of the bis-(methylammonium) salt of perylene-3,4,9,10-tetracarboxylic acid bis-(methylamide), but they may also be added with good success at an earlier or later moment during the reaction. It is also possible not to add the resin acids or the salts thereof until the condensation of the N,N'-dimethylperylimide is complete.

After the pigment has formed, the resin acids may be converted into insoluble resinates by adding appropriate metal salts, preferably calcium, barium or aluminum salts or the aqueous solutions thereof, thus fixing them on the pigment. This method provides pigments of a particularly high transparency. Transparent pigments are also obtained when the resin acids are not precipitated but predominantly washed off when isolating the pigment by filtration.

The reaction may be carried out in the presence of a small amount of a condensation agent which promotes the formation of the imide, for example hydrochloric acid or sulfuric acid.

According to an especially advantageous method for the preparation of the the N,N'-dimethylperylimide, the perylene-3,4,9,10-tetracarboxylic acid dianhydride is introduced while stirring into a dilute solution of methyl amine at a temperature of from 0 to 10° C., stirring is then continued for some time to complete the formation of the bis-(methylammonium) salt of perylene-3,4,9,10-tetracarboxylic acid bis-(methylamide), then resin acid is added and finally the quantitative formation of N,N'-dimethylperylimide is brought about be heating the mixture to a temprature of from 70° to 150° C. When the reaction is complete, the pigment is isolated by filtration in an almost quantitative yield. The pigment may then be freed from adherent traces of perylene-tetracarboxylic acid dianhydride or of incompletely condensed products by aftertreating it with dilute sodium hydroxide solution and subsequently washing it with hot water.

The advantage of the process of the invention is its good economy due to a single-step reaction that yields a valuable pigment without any finishing operation. Another substantial advantage of this process is that it does not pollute the water, since the almost quantitative reaction of perylene-3,4,9,10-tetracarboxylic acid dianhydride with methyl amine provides a filtrate that contains only excess methyl amine. Hence, after the consumed amount of methyl amine has been replaced, this filtrate can be used for further reactions. It is, however, also possible to separate the excess methyl amine, for example by means of steam, and absorb it in the amount of water intended for further reactions.

The N,N'-dimethylperylimide obtained according to the invention is a brilliant red pigment having a high tinctorial strength and transparency as well as an outstanding fastness to light and weathering. The pigment so obtained is much purer than the products obtained by methylation of perylene-3,4,9,10-tetracarboxylic acid diimide.

In some cases, the transparency of the N,N'-dimethyl-perylimide can be increased by aftertreating the aqueous suspension of the pigment in the presence of resin acids by means of an apparatus that causes mechanical fine division, for example bead mills, vibratory mills, roller mills or agitating mills, or high-speed agitators having a grinding effect.

An aftertreatment of the transparent pigments obtained by the condensation with organic solvents at an elevated temperature may also yield pigments having a good hiding power.

The pigment obtained according to the invention is suitable for pigmenting any kind of lacquer or varnish, for producing printing pastes, distemper or emulsion paints, for the mass dyeing and coloration of synthetic, semi-synthetic or natural macromolecular substances, such as for example polyvinyl chloride, polystyrene, polyamides or polyethylene. It may also be used for the spin-dyeing of natural, regenerated or man-made fibers as well as for the printing of textiles and paper. It is especially suitable for pigmenting metal effect lacquers.

The following Example illustrate the invention, the parts and percentages being by weight unless stated otherwise.

EXAMPLE 1

137 Parts of perylene-3,4,9,10-tetracarboxylic acid dianhydride were introduced while stirring at 0°-5° C. within 1 hour into a mixture of 2,800 parts of water, 172 parts of a 50.2% aqueous methyl amine solution and 2 parts of 96% sulfuric acid. Stirring was continued for 1 hour at 0°-5° C. The temperature was then evenly raised to the boil for 3 hours. The N,N'-dimethylperylimide formed was then suction-filtered. The filter-cake was introduced into 2,000 parts of a 3% potassium hydroxide solution and stirred for 1 hour at 90°-100° C. The mixture was then suction-filtered and washed with hot water until the filtrate remained colorless. The residue was dried at 60° C. in vacuo to yield 143 parts of pigment.

The pigment thus prepared can be used to color stoved enamels brilliant intensive red shades according to known methods.

When the condensation reaction was carried out using 2 parts of sodium salt of octadecane-sulfonamidoacetic acid or 1 part of oxethylated nonylphenol, valuable pigments having a higher transparency were also obtained.

When the moist residue obtained by filtration was stirred into 2,000 parts of water, an aqueous solution of 11 parts of the sodium salt of abietic acid was added and then, at 80°-90° C., an aqueous solution of 21 parts of anhydrous calcium chloride was admixed, the pigment obtained after isolation and drying had a high tinctorial strength and an improved transparency.

EXAMPLE 2

78.4 Parts of perylene-3,4,9,10-tetracarboxylic acid dianhydride were introduced while stirring at 0°-5° C. within 1 hour into a mixture of 1,600 parts of water and 192 parts of a 27.6% aqueous methyl amine solution. Stirring was continued for 1 hour at 0°-5° C. Then a solution of 6 parts of the sodium salt of abietic acid in 40 parts of water was added. The temperature was then evenly raised to the boil within 1 hour, and the mixture was refluxed for 2 hours. The mixture was then suction-filtered, the filter cake was washed first with a hot 3% aqueous potassium hydroxide solution and then with hot water. The residue was dried at 60° C. in vacuo. The yield was 81.8 parts of N,N'-dimethylperylimide.

The pigment thus prepared can be used to color stoved enamels brilliant intense red shades having a high transparency. Owing to its high transparency and tinctorial strength, the pigment is excellently suitable for coloring metal effect lacquers.

When, instead of 6 parts of the sodium salt of abietic acid, 6 parts of the sodium salt of a resin mixture consisting of 85% of abietic acid, 10% of dihydro-abietic acid and 5% of tetrahydro-abietic acid were used, a pigment having the same quality was obtained.

EXAMPLE 3

39.2 Parts of perylene-3,4,9,10-tetracarboxylic acid dianhydride were inroduced while stirring at 0°-5° C. within 1 hour into a mixture of 850 parts of water and 53 parts of a 50.2% aqueous methyl amine solution. Stirring was continued for 1 hour at 0°-5° C. Then a solution of 3 parts of "Dymerex"(®) (a resin consisting substantially of resin acid dimers, which is being commercialized by Messrs. Hercules Powder Company) in 30 parts of water and 5 parts of 2N sodium hydroxide solution ws added. The temperature was then evenly raised to the boil within 1 hour, and te mixture was refluxed for 2 hours. It was then suction-filtered while hot, and the filter cake was washed with hot water. The residue was dried at 60° C. in vacuo to yield 41.3 parts of N,N'-dimethylperylimide.

When used for coloring stoved enamels, the pigment obtained is distinguished by a high transparency and is excellently suitable for coloring metal effects lacquers.

When the solids suspension that had been refluxed for 2 hours was ground for a short time in a disintegrating mill, for example a bead mill, and only then the N,N'-dimethylperylimide was isolated by filtration, the pigment obtained had an even higher transparency.

When, instead of 3 parts of "Dymerex", only 2 parts of this resin acid were used, a pigment of also a high transparency was obtained.

EXAMPLE 4

117.6 Parts of perylene-3,4,9,10-tetracarboxylic acid dianhydride were introduced while stirring at 25°-30° C. within 15 minutes into a mixture of 1,200 parts of water and 260 parts of a 27.6% aqueous methyl amine solution. Stirring was continued for 1 hours at 20°-30° C. The temperature in the autoclave was then raised to 100° C., and the mixture was stirred for 2 hours at 100°-110° C. After cooling to 80° C., the N,N'-dimethylperylimide was suction-filtered. The filter cake was washed first with a hot aqueous 3% potassium hydroxide solution and then with hot water. The pigment was dried at 60° C. in vacuo to yield 123 parts of N,N'-dimethylperylimide.

The so-obtained pigment was used to color stoved enamels brilliant intense red shades according to known methods.

When the condensation reaction was carried out, instead of at 100°-110° C., at 130° to 140° C. in a closed vessel, the pigment obtained had also a high tinctorial strength.

Excess methyl amine could be eliminated from the filtrate by means of steam and then recovered for further reactions by absorption in water.

EXAMPLE 5

39.2 Parts of perylene-3,4,9,10-tetracarboxylic acid dianhydride were introduced while stirring at 0°-5° C. within 1 hour into a mixture of 800 parts of water and 107 parts of a 24.7% aqueous methylamine solution. Stirring was continued for 1 hour at 0°-5° C. Then a solution of 3.3 parts of the sodium salt of a technical-grade abietic acid (purity: 90%) in 30 parts of water was added. The mixture was then heated to the boil within 1 hour and refluxed for 30 minutes. After cooling to 90° C., a solution of 6 parts of anhydrous calcium chloride in 20 parts of water was added. Refluxing was then continued for another hour. The precipitate was suction-filtered while hot.

The filter cake was washed first with a hot 2% potassium hydroxide solution and then with hot water, and the residue was dried at 60° C. in vacuo to yield 44 parts of a pigment containing resinate.

the pigment thus prepared was used to color stoved enamels brilliant intense red shades according to known methods. Owing to its high transparency, the pigment is excellently suitable for coloring metal effect lacquers.

When, instead of an aqueous solution of 3.3 parts of the sodium salt of technical-grade abietic acid, an aqueous solution of 3.3 parts of the sodium salt of tallic resin acid or of 3.3 parts of the sodium salt of colophony were used, a pigment of comparable quality was obtained. Pigments having a very high transparency were also obtained by replacing the sodium salt of abietic acid by the same amount of the sodium salt of a maleinate resin which had been obtained by reacting abietic acid with maleic acid anhydride.

EXAMPLE 6

39.2 Parts of perylene-3,4,9,10-tetracarboxylic acid dianhydride were introduced while stirring at 0 – 5° C within 1 hour into a mixture of 820 parts of water and 80 parts of an aqueous 24.7% methyl amine solution. Stirring was then continued for 1 hour at 0 – 5° C. Then a solution of 3 parts of "Dymerex" in 40 parts of water and 5 parts of 2N sodium hydroxide solution together with 1 parts of the sodium salt of actadecane-sulfonamidoacetic acid was added. The mixture was then heated to the boil within 1 hour and refluxed for 1 hour. After cooling to about 90° C, a solution of 6 parts of anhydrous calcium chloride in 20 parts of water was added. Refluxing was then continued for two hours. The precipitate was suction-filtered while hot and washed with hot water. The residue was dried at 60° C in vacuo.

The pigment thus prepared is very suitable for coloring metal effect lacquers owing to its particularly high transparency.

When instead of 80 parts of a 24.7% aqueous methyl amine solution, only 52 parts of this solution were used, the pigment obtained had a slightly reduced transparency.

When, instead of 1 part of the sodium salt of actadecanesulfonamidoacetic acid, 1 part of an oxethylated colophony was used, a pigment of also a very high transparency was obtained.

When the moist filter cake obtained according to this method was introduced, prior to drying, into isopropanol at 20°-30° C., stirred for several hours at 20°-30° C., then isolated by filtration and dried at 60° C. in vacuo, the pigment obtained was distinguished, besides its high transparency, by an improved dispersibility in lacquers.

We claim:

1. In a process for preparing a pigmentary form of N,N'dimethyl-perylene-3,4,9,10-tetracarboxylic acid diimide by reacting perylene-3,4,9,10-tetracarboxylic acid anhydride with an excess of methylamine in aqueous solution in two steps, the improvement comprising: reacting said anhydride with a solution of at least a 4-fold molar amount of said amine at a temperature below 30° C., then heating the reaction mixture to a temperature of 70° to 150° C. and isolating the pigment.

2. N,N'-dimethyl-perylene-3,4,9,10-tetracarboxylic acid diimide pigment obtained by the process defined in claim 1.

3. A process as claimed in claim 1, wherein said bis-(methylamide) is reacted further without isolation.

4. A process as claimed in claim 1, wherein said first stage is performed at 0° to 10° C.

5. A process as claimed in claim 1, wherein per each mol of said anhydride 4 to 8 mols of methylamine are added.

6. A process as claimed in claim 1, wherein the reaction is performed in the 10 to 25-fold amount of water, referred to the weight of said anhydride.

7. A process as claimed in claim 1, wherein the reaction takes place in the presence of a surfactant.

8. A process as claimed in claim 7, wherein the surfactant is a resin acid or a watersoluble resin soap.

9. A process as claimed in claim 8, wherein the resin acid or resin soap is precipitated onto the reaction product by adding a metal salt capable of forming a resin soap which is sparingly soluble or insoluble in water.

10. A process as claimed in claim 8, wherein the amount of resin acid or resin soap is 2 to 20%, referred to the weight of said anhydride.

11. A process as claimed in claim 10, wherein the amount is 5 to 10 %.

* * * * *